United States Patent [19]
Hill et al.

[11] Patent Number: 6,146,596
[45] Date of Patent: Nov. 14, 2000

[54] SOIL REMEDIATION APPARATUS WITH SAFEGUARD SYSTEM

[75] Inventors: Ronnie D. Hill, Fort Mill, S.C.; Charles L. Kiper, Charlotte, N.C.

[73] Assignee: McLaren Hart Environmental Engineering Corporation, Rancho Cordova, Calif.

[*] Notice: This patent is subject to a terminal disclaimer.

[21] Appl. No.: 09/106,708

[22] Filed: Jun. 29, 1998

[51] Int. Cl.[7] .............................. G05B 9/00; B09C 1/06; F23G 7/14
[52] U.S. Cl. ......................... 422/117; 422/112; 110/236; 110/193; 431/19
[58] Field of Search ..................................... 422/112, 113, 422/117, 118; 110/188, 189, 190, 193, 236; 431/19

[56] References Cited

U.S. PATENT DOCUMENTS

| Re. 36,222 | 6/1999 | O'Ham | 110/233 |
|---|---|---|---|
| 2,874,763 | 2/1959 | Hobbs | 431/79 |
| 3,768,956 | 10/1973 | Mueller et al. | 431/20 |
| 4,457,692 | 7/1984 | Erdman | 431/19 |
| 4,667,609 | 5/1987 | Hardison et al. | 110/236 |
| 4,842,510 | 6/1989 | Grunden et al. | 431/19 |
| 5,127,343 | 7/1992 | O'Ham | 110/233 |
| 5,158,446 | 10/1992 | Hall | 431/20 |
| 5,186,386 | 2/1993 | Lynch | 236/11 |

Primary Examiner—Marian C. Knode
Assistant Examiner—Susan Ohorodnik
Attorney, Agent, or Firm—Craig M. Bell

[57] ABSTRACT

The present invention is an improved apparatus and method for its use in the decontamination and remediation of soils laden with organic hydrocarbons and toxic inorganic compounds. The soil to be treated is placed in a soil treatment tray which is subsequently placed within the treatment chamber. A multiple radiant heater rack is placed over the treatment chamber and the contaminant compounds are heated and vaporized. A blower fan creates a vacuum which pulls the organic hydrocarbon gases and other vaporized contaminants through the soil and out to the contaminant vapor removal/condenser unit where the compounds are liquified and containerized. A novel automatic safeguard system insures that all burners and fans are running continuously and automatically shuts down one or more components of the system should a burner or fan malfunction so that the potentially dangerous accumulation of explosive gasses is prevented.

8 Claims, 3 Drawing Sheets

SOIL REMEDIATION APPARATUS WITH SAFEGUARD SYSTEM

FIELD OF THE INVENTION

The present invention relates generally to methods and means for environmental detoxification and remediation. More specifically, the present invention relates to an improved apparatus and method for use in the remediation of soil contaminated with toxic chemicals and volatile hydrocarbons.

BACKGROUND OF THE INVENTION

The dumping of hazardous wastes and toxic chemicals into the environment is an on-going problem both here in the United States and throughout the world. In the United States alone, superfund sites are numerous and Environmental Protection Agency regulations have been enacted that require those responsible for such contaminated areas to clean them up. Gasoline and other petroleum products are discharged into the soil on a regular basis both inadvertently and deliberately. There is an unquestionable need for means to remediate areas containing high levels of inorganic and organic solvents, PCBs, volatile hydrocarbons and the like.

U.S. Pat. No. 4,202,282 to Hobbs discloses a method for thermally processing materials in a chamber on a conveyer belt utilizing infrared heating to drive off gasses from the material being processed, and mixing the released gasses with air flowing over, above, and parallel to the materials in the opposite direction of the material movement to provide a portion of heat for drying the materials. Apparently the materials are wet at the time they are introduced to the incinerating chamber.

U.S. Pat. No. 4,670,634 to Bridges et al. teaches in situ decontamination of soil utilizing radio frequency energy whereby the contaminants are vaporized, the gases removed from the sample and late r cooled and condensed. The process then collects the removed hydrocarbons in fluid form.

U.S. Pat. No. 4,815,398 to Keating et al. discloses an apparatus for drying contaminated material to below the cracking temperature of the volatile organics which contaminate the material, followed by heating in a kiln to a temperature high enough to break down the volatile organics to non-toxic products, and recovering the gaseous products.

U.S. Pat. No. 4,881,475 to De Leur et al. discloses a method for cleaning contaminated soil by indirectly heating the soil in a sealed rotating furnace, then combusting the released contaminants in a second furnace. In this process, the heat is provided to the soil by induction from the furnace wall rather than being applied directly to the soil.

U.S. Pat. No. 4,974,528 to Barcell discloses yet another decontamination apparatus consisting of a rotary dryer in which contaminated soil is exposed to a gaseous flame to vaporize the contaminants. Air is then mixed with the released volatiles to form an exhaust gas which is filtered, heated and incinerated at less than 1700° F.

U.S. Pat. No. 5,514,189 to Crosby teaches a method and apparatus for soil remediation comprising a thermal desorption unit in which contaminated soil is heated under a vacuum thereby vaporizing the contaminants. The contaminants are drawn through a discharge pipe wherein they are condensed by cooling. The gases are condensed to a liquid and contained in a recovery vessel. The soil is then recycled back to the location from which it was removed.

U.S. Pat. No. 5,553,189 to Stegmaier discloses a radiant heating plate for the treatment of contaminated surfaces. The apparatus further comprises an insulating layer and a vapor barrier that is positioned above the heating plate and below the insulation. The heating plate heats the contaminated surface which vaporizes the volatile hydrocarbons, inorganic toxins, etc. These are then drawn up through a thermal oxidizer and collected in an absorbent bed downstream from the heating plate.

None of the aforementioned patents disclose methods or means to decontaminate polluted soil in large quantities using a batch process that can remediate toxic soil samples in a safe, efficient manner. A related patent to the present application, Reissue of U.S. Pat. No. 5,127,343 now Re 36,222 to O'Ham discloses and claims a method and apparatus for the revival of contaminants from the soil consisting of a shallow container with vertical sides and a bottom with a plurality of recessed chambers contained therein. An open mesh entry area is at one end and a gas discharge orifice exists at the other end of each of the recessed chambers contained therein. A rack consisting of burners or heating elements slides over and covers the bin for heating the soil sample to be treated. The soil is heated under reduced pressure so that volatile hydrocarbons and other inorganic or organic contaminants are vaporized as a gas. The reduced pressure is created by a vacuum in the base-contained chambers and this pulls the toxic gases downwardly through the soil and out through the chambers for discharge and removal.

SUMMARY OF THE INVENTION

The present invention is an improved method and apparatus for the remediation of contaminated soils comprising an automatic means to control the source and flow of heat and the hot air generated thereby that is used to vaporize the soil contaminants in a soil remediation device such as that set forth in RE 36,222 to O'Ham. The flow of hot air is controlled by a flameout mechanism consisting of a flame sensor that is mounted within the gas burners that heat the air in order to vaporize the contaminant materials. The sensors are connected to a controller which opens and closes the gas valve(s) of the burners. If and when the flame in the burners goes out, the sensor signals the controller which shuts the valve thereby preventing a hazardous gas buildup. operatively aligned thereto, a pneumatic pressure switch detects whether or not the main blower is moving the air containing the vaporized hydrocarbons and the air to be heated. If not, the pressure switch closes the gas valve which shuts off the burners. Simultaneously, a back-up fan is turned on which prevents the possible accumulation and ignition of the contaminant vapors within the unit.

DETAILED DESCRIPTION OF THE INVENTION

The present invention comprises an improved contaminant extractor device for the remediation of soils contaminated with organic solvents, hazardous inorganic compounds and petroleum related hydrocarbons. Specifically, the invention comprises an improved contaminant extractor device as set forth in Reissue Pat. No. 36,222 to O'Ham which is hereby incorporated by reference. That device is an apparatus for decontaminating and sanitizing soil, particularly soil containing petroleum hydrocarbons, such as gasolines, oils, and the like.

Figure 1:
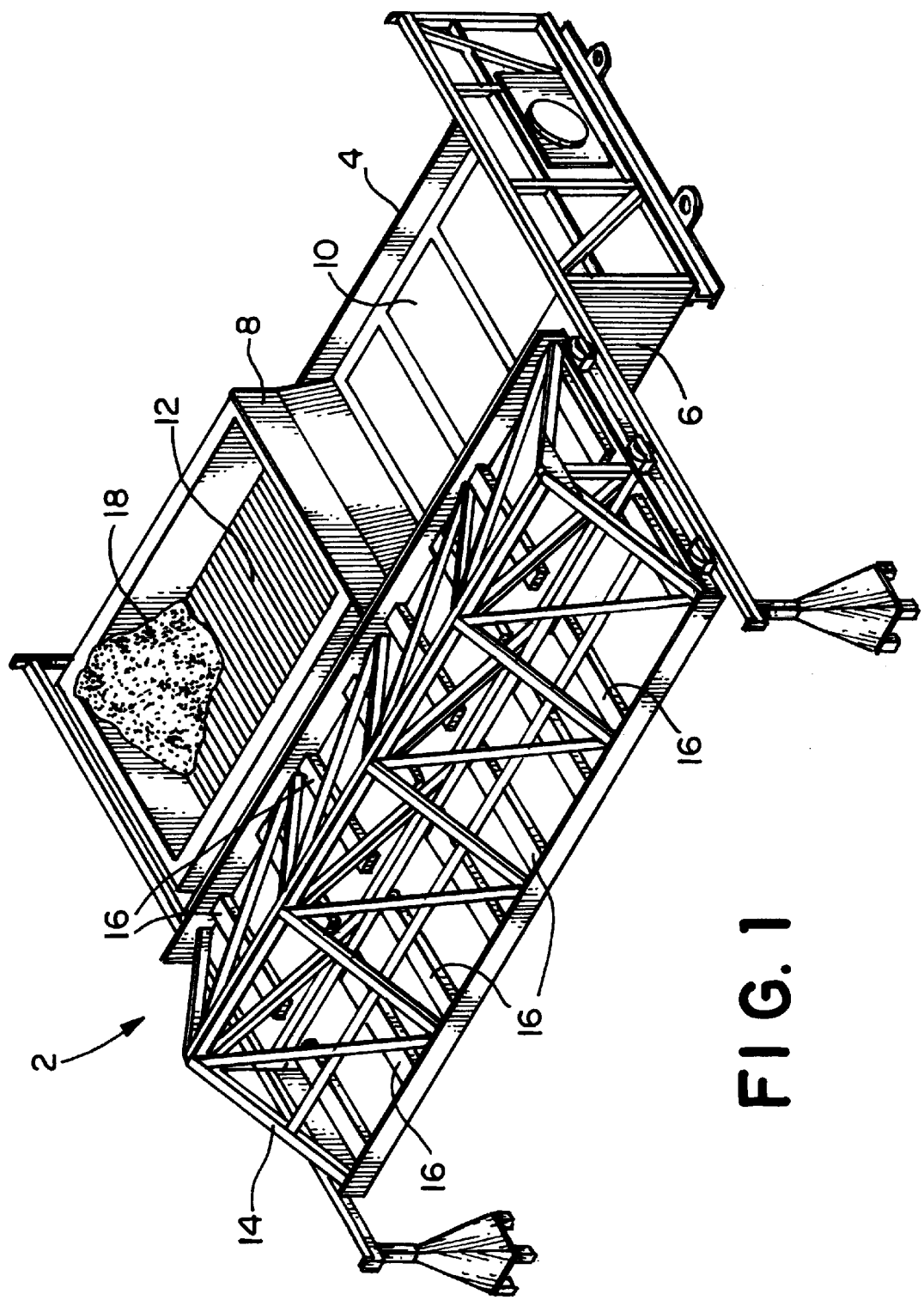
FIG. 1 is an overall view of the contaminant extractor and treatment unit known in the art.

Referring now to FIG. 1, the apparatus (2) comprises a generally flat shallow container (4), preferably with vertical sides (6). FIG. 1 also shows the contaminant extractor unit comprised of a container (4) with two soil trays or treating chambers (8). One of the trays is shown in place, the other tray removed in order to fully depict the elements of the device. The container has a multiplicity of elongated recessed chambers in its bottom wall (10), with an open mesh entry area at the upper side of the chambers, and a gas discharge orifice (not shown) at one end of each such chamber. Vacuum pumps communicate with the interior of the container through the gas discharge orifice.

A rack (14) containing a multiplicity of burners or heaters (16), preferably infrared heaters, is adapted for positioning over the soil (18) to be treated within the container, with the heaters directed downwardly against the upper surface of the soil. The rack of heaters may be adapted for sliding or rolling movement into and out of the operative position above the container. A vacuum pump (not shown) provides the impetus for downward movement of the heated hydrocarbon vapors and ambient air from outside the chamber through the soil, which exits through the gas discharge orifice pulled by the vacuum pump and is preferably containerized and then disposed. The unit is also preferably portable, as the cost for transporting the unit to the site to be treated is much less than the cost of moving the earth to the treatment location and back to the place where is to be used as fill.

The method consists of charging materials such as contaminated dirt and soil into the treating bin (8) having sides (6) and a bottom (12), the bottom being a fine mesh screen or otherwise porous and in open communication with the recessed chambers (10). The bin (8) is also open to the atmosphere at the top. A blower fan (not shown) establishes a vacuum, or at least a partial vacuum, through the bottom of the container to create a down draft through the generally loosely packed soil (18). The soil is heated by the radiant heaters (16) from the top, and the hot gases are pulled downward through the soil together with atmospheric air that is drawn downward behind or commingled with the gases. The hydrocarbon vapors are collected in the recessed vacuum chambers as they exit the bottom of the soil layer and then are either collected or discharged to the atmosphere. Preferably, a condenser unit is located in the unit and this liquifies the contaminants which can then be containerized and disposed. Finally, the decontaminated soil is removed from the treatment chamber and eventually recycled in the environment.

The improved contaminant extractor comprises much of these same elements including a safety interlock system designed to automatically shut down the extractor should a problem arise during soil remediation treatment. Obviously, the vaporization of volatile hydrocarbons creates a potentially hazardous situation in terms of spontaneous ignition, fire and even explosion. The potential for dire consequences is increased considering this environment exists in the nearby presence of propane gas heated burners whose radiant heat vaporize the volatile hydrocarbons and inorganic contaminants trapped in the solid. The likelihood of fire and explosion is not great providing all the operational components of the extractor are functioning properly. However, several situations could arise in which the potential for disaster is increased.

In one scenario, the flame that provides the radiant heat in the propane gas burners could somehow be extinguished. Should this occur undetected, propane gas would continue to be released and build up within the soil treatment container area. This could then easily ignite and cause an explosion or fire of considerable destruction and the possible loss of lives.

A second situation is one in which the main blower which creates the vacuum and provides air flow to draw the volatile vapors out from the soil container treatment tank for containment or release somehow malfunctions. Here again, there would be a build-up of the vaporized volatile hydrocarbon gasses and/or vaporized inorganic contaminants which could become a potentially explosive situation, particularly if ignited by the propane gas burners.

Figure 2:
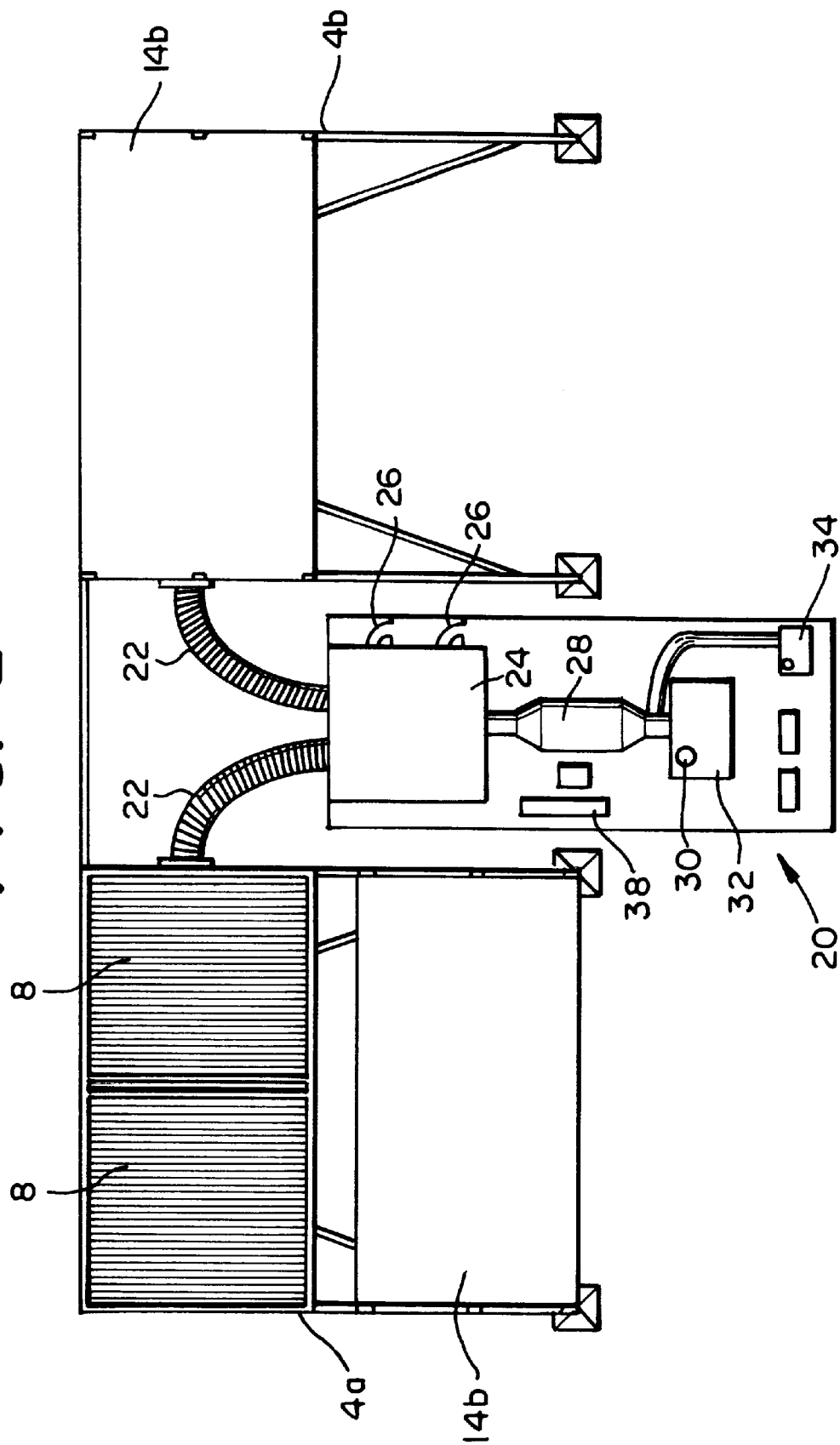
FIG. 2 is an overall view of the contaminant extractor and treatment unit with the automatic hot air control means of the present invention.

Referring now to FIG. 2, two of the contaminant extractor units (4a, 4b) are shown in a operative relationship with a contaminant vapor removal/condenser component (20) which contains the fans (32) which create the vacuum underneath the soil trays (8) and draws the vaporized contaminants and hydrocarbons out of the soil to be subsequently liquified and condensed. Extractor unit (4a) is shown open with the heater rack (14a) drawn back exposing the two treating chambers or soil trays (8) in place. Extractor (4b) showns the unit with the heater rack (14b) covering the treatment chamber and positioned as it would be during the soil remediation process.

The treatment chambers are connected to the vapor removal/condenser unit (20) by means of transfer ducting pipes (22) which are in open communication with the recessed chambers (10) in the bottom of the container unit (4). The transfer ducting pipes (22) feed into a condenser unit (24) that cools the hot, vaporized contaminant gasses using chilled water pipes as the coolant. The chilled water enters and exits the unit through portals (26) as is known in the art. As will be described in greater detail, infra, the ambient air that now has a majority of the vaporized contaminants removed is further purified as it passes through a dry particulate filter (28) before being discharged into the atmosphere through an exit stack (30). The liquified hydrocarbons and contaminants are collected from the condenser (24), containerized and disposed of in an appropriate manner.

Figure 3:
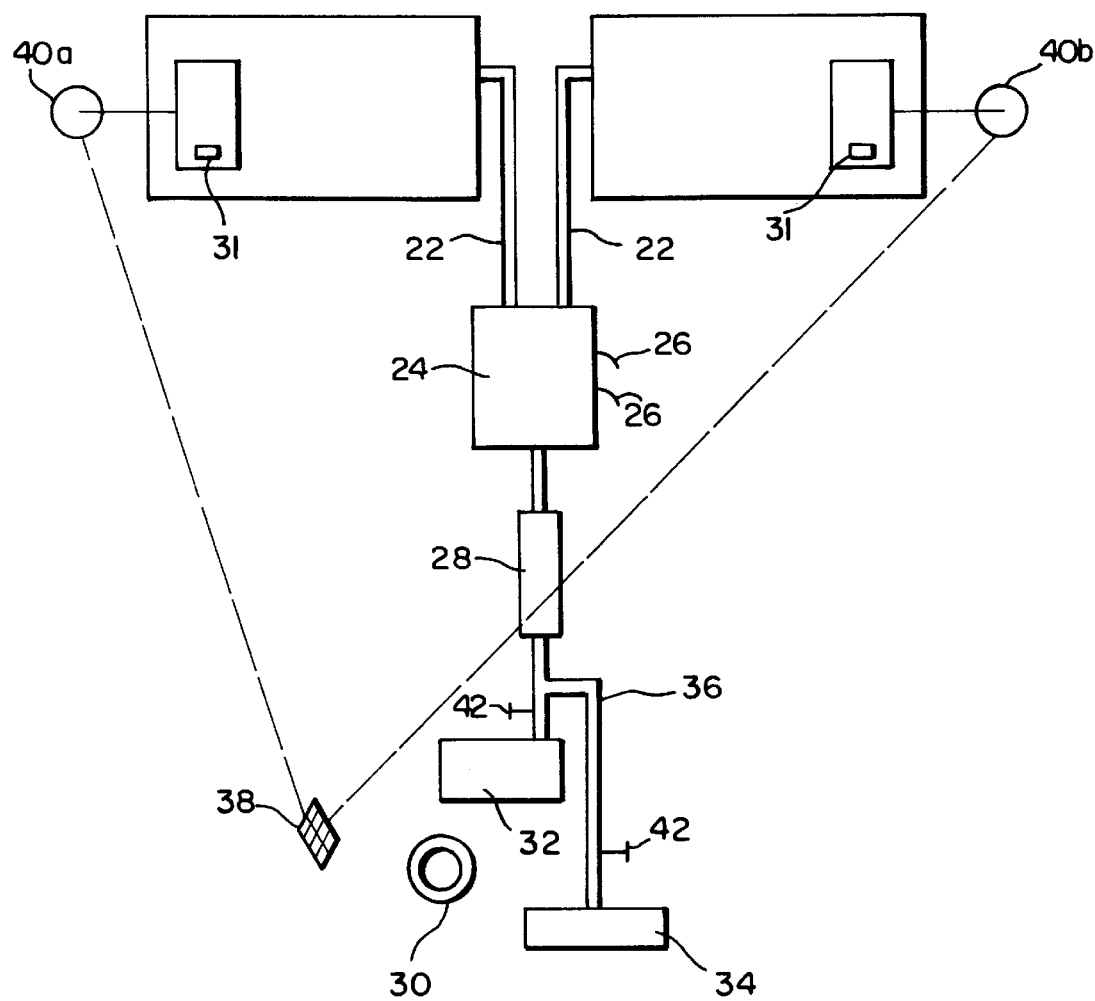
FIG. 3 is a schematic diagram of the automatic hot air control means of the present invention.

As will be more fully described with respect to the components as set forth in FIG. 3, the contaminant vapor removal/condenser unit further comprises a primary (32) and a backup secondary blower (34) fan which creates the vacuum that draws the vaporized contaminants from the treating chamber and away from the soil. These fans are integrally connected to an automatic safeguard monitoring system so that should the first blower exhaust fan (32) malfunction and cease operation during soil remediation and treatment, a pressurized switch (not shown) will automatically turn on the secondary blower exhaust fan (34) so that the vaporized contaminants continue to be drawn from the soil, condensed and containerized.

Referring now to FIG. 3, the components of the present invention are schematically shown from an overall operational perspective apart from the contaminant extractor device within which it functions that is shown in FIGS. 1 and 2. The primary vacuum exhaust fan (32) is shown connected by means of the transfer ducting pipe (36) to the dry particulate filter (28) which is in turn connected by the ducting pipe to the condenser (24) wherein the hot contaminant gasses are cooled by the water cooling system whose inlet/outlet coils are shown (26). Upstream from the condenser (24), the ducting pipe (36) is bifurcated into the two separate conduits (22) each of which then leads to a heater chamber assembly (4) wherein the heater assembly (14) vaporizes the contaminants in the soil.

Within the heater assembly mounted to the heater flame is a flame sensor (31) with sensor terminals attached to each one of the burners in the heater assembly. These sensors are either ultraviolet detectors or rectifying flame rods (Controlled Combustion, Inc., Matthews, N.C.) which are electronically linked to a control module (38). When a burner flame goes out for one reason or another, the ultraviolet detector or rectifying flame rod (31) electronically signals the control module (38) of the situation. Within the module is a programmable multiple logic module that interprets the signal and electronically signals a main solenoid gas valve (40a, 40b) that provides the propane gas for each heater assembly. (Pyronics Inc.). Upon receiving the signal from the main controller (38) the valve automatically closes thereby shutting off the gas to the unit and all burners (16) in the particular heating assembly are thereby turned off.

The ventilating system of the unit is driven by a vacuum created within the slotted chambers (10) below the soil sample to be treated. The vacuum is created by the main blower fan (32) located at end of the transfer ducting tubes (22). Auxiliary to this is secondary or auxiliary blower fan (34) which is also in communication with the transfer ducting pipe (36) albeit branched off from the main ducting pipe (22) that directly feeds into the main blower fan (32). Again, as described in Re 36,222 to O'Ham when the system is operational, the burners of the heater assembly vaporize the organic hydrocarbons and other inorganic contaminants in the soil. The vacuum created by the main blower fan (32) extends to the slotted chambers (10) beneath the soil (18) which draws the hydrocarbon vapors back down through the soil and out through the transfer ducting pipe, condenser (24) and a dry particulate filter (28). The contaminants then are mostly liquefied in the condenser and containerized although some small particulate matter that may remain in the ambient air is then subsequently removed by the particulate filter (28).

When the heaters of the system are on, it is obviously critical that the blower fan (32) and vacuum created thereby be operational so as to prevent the potentially hazardous buildup of toxic gases within the soil chamber/heater assembly unit. There are however, obvious situations wherein the main blower may cease to function, breakdown or inadvertently be turned off.

As a safeguard, the interlock system of the present invention further comprises an automatic backup system to the main blower unit. Referring again to FIG. 3, a pneumatic pressure switch (42) is mounted within the transfer ducting pipe to the main blower fan. When it is operational, the vacuum created thereby in recessed chambers in the bottom wall (10) of the treatment unit (4) draws the ambient air within the system as well as the vaporized hydrocarbons. The pneumatic switch is a diaphragm-actuated electrical control switch operatively initiated by pressure (Pyronics, Inc., Belgium). Pressure or suction applied against the diaphragm forces it against an adjustable spring which is set at a desired value. When the existing pressure or suction drawn by the main blower exceeds or is less than the spring setting a mercury switch closes or opens.

The switch is operationally associated with both the gas valves (40a, 40b) and to the starter of a secondary back up blower (34) via the control module (FIG. 2, #38). If the primary blower (32) ceases operation, the increase or decrease in pressure created by the sudden absence of the vacuum actuates the switch which closes the gas valves(40a, 40b) to the burners of the heating assembly (FIG. 1, 16) and simultaneously starts the back up fan (34). In this manner, the vaporized contaminants remaining in the system can still be drawn off out of the heater assembly/soil container unit, condensed and containerized. The control module (38) is further provided with an alarm (light or audio) that signals and warns personnel of the shut down of the system and the need for its re-setting and re-ignition.

What is claimed is:

1. An improved contaminant extractor apparatus for the removal of organic hydrocarbons and inorganic materials from contaminated soils comprising an open soil container tray for holding said soil, a heater assembly that is moveably attached to and covers the open top of said container; gas generated burners within said heater assembly for vaporizing said organic hydrocarbons and inorganic materials and a primary blower fan for removing the vaporized materials from the heater/soil container assembly, said improvement comprising a safeguard interlock means for automatically detecting a breakdown in the heater or vacuum assemblies and remediation thereof through the activation of a secondary blower fan that is in communication with recessed chambers below said soil container tray upon failure of the primary blower fan so as to create a vacuum therein and the deactivation of said heater assembly through the closure of a solenoid gas valve.

2. The improved contaminant extractor of claim 1 wherein said safeguard interlock means comprises
 a. a flameout control monitor;
 b. a pressure sensor control monitor; and
 c. an integrally operative central control module.

3. The improved contaminant extractor of claim 2 wherein said flameout control monitor consists of a heat or flame sensor operatively connected to said solenoid gas valve by means of said control monitor.

4. The improved contaminant extractor of claim 3 wherein said gas valve operatively controls the flow of said gas for said gas burners.

5. The improved contaminant extractor of claim 4 wherein said flame sensor is selected from the group consisting of ultraviolet detectors, rectifying flame rods and combinations thereof.

6. The improved contaminant extractor of claim 5 wherein said pressure sensor control monitor comprises a diaphragm actuated pneumatic control switch.

7. The improved contaminant extractor of claim 6 wherein said pneumatic control switch is operatively connected to said solenoid gas valve and said secondary blower fan via said central control monitor.

8. The improved contaminant extractor of claim 6 wherein said pneumatic control switch is actuated upon the occurrence of a rise in atmospheric pressure within a transfer ducting pipe thereby activating said valve and said secondary blower.

* * * * *